US006294253B1

(12) United States Patent
Smith, Jr.

(10) Patent No.: US 6,294,253 B1
(45) Date of Patent: Sep. 25, 2001

(54) UNIFORMLY DISPERSING FIBERS

(75) Inventor: Henry Dall Smith, Jr., Athens, TN (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/371,981

(22) Filed: Aug. 11, 1999

(51) Int. Cl.⁷ ........................................ D02G 3/00
(52) U.S. Cl. .................. 428/361; 428/375; 428/378; 428/396; 428/398; 428/403
(58) Field of Search ................... 428/378, 392, 428/292.1, 359, 361, 364, 375, 396, 398, 403

(56) References Cited

U.S. PATENT DOCUMENTS

| | | | |
|---|---|---|---|
| 3,869,268 | * 3/1975 | Briar et al. ................................ 65/2 |
| 4,194,896 | * 3/1980 | Symborski et al. ........................ 65/3 |
| 4,241,136 | * 12/1980 | Dereser ................................ 428/378 |
| 4,840,755 | * 6/1989 | Nakazawa et al. ..................... 264/18 |

* cited by examiner

Primary Examiner—Merrick Dixon
(74) Attorney, Agent, or Firm—Robert D. Touslee

(57) ABSTRACT

A sized staple fiber product that disperses quickly, thoroughly and uniformly in water is particularly useful in the manufacture of gypsum board by the slurry process. An aqueous chemical size composiiton on the surface of the fibers contains a high level of surfactant and can contain a polymer film former and a biocide. Preferably, the fiber is chopped glass fiber. Novel sizing composition and methods of making and using the fiber are also disclosed.

12 Claims, No Drawings

UNIFORMLY DISPERSING FIBERS

The invention involves a glass fiber having a chemical sizing applied on the surface to allow the fiber to disperse quickly and uniformly in plain water, the sizing composition and the methods of making and using the sized fiber.

BACKGROUND

Inorganic staple fiber including glass fiber, ceramic fiber and mineral fiber like mineral, glass or slag wool have been used extensively for reinforcing numerous materials and for enhancing the fire resistance of products. For example, glass fiber has been used to reinforce and enhance the fire resistance and rating of gypsum board.

At least two processes are typically used for adding glass fiber in the manufacture of gypsum board. The first process feeds dried glass fiber having a low moisture content and a chemical sizing on the fiber into wetted calined gypsum, usually while the wetted material is being mixed and transported in an auger mixer. The fiber is dispersed in the mix by the mixing action. The second process involves adding the fiber directly into the water to make a slurry for a gypsum board before other ingredients are added. The water is typically a low quality, such as tap water, well water, lake or river water, i. e. plant water. The second process using low quality water is preferred by some manufacturers. For the second process, it is necessary that the fiber disperse quickly and uniformly. If it doesn't, each cubic inch of the board won't have enough fibers to pass the fire test and excess fiber will have to be used to insure enough fibers are in each portion of the board.

Unfortunately, the low moisture fiber made for feeding into the wetted gypsum mixture does not disperse uniformly and quickly necessitating that excess dry fiber be used or that a dispersant be added to the water prior to adding the fiber. Some dispersants found to work marginally in dispersing the dry fiber are flammable, presenting an undesirable risk to the manufacturing plants using the fiber.

Other glass fiber products are available in both dried and having a higher moisture content, both with a chemical sizing thereon depending on the intended application. Almost all glass fibers have a chemical sizing on their surface to protect the surface from abrasion and scratches during manufacture and use which will substantially reduce the strength of the fiber. The chemical sizing also can function to aid dispersion and to provide a better bond between the glass fiber and a matrix that the fiber will reinforce, such as a plastic material, a resin binder, etc.

Dry glass fiber products intended for use in plastics products will not disperse sufficiently in water and therefore are not suitable. Various wet chop fiber products, i. e. undried, chopped continuous glass fiber for use in making nonwoven mats in wet process machines or paper machines also did not disperse sufficiently. The sizing on these latter fiber products is designed to cause the fiber to disperse well in a "whitewater" and to bond well to a urea formaldehyde or acrylic resin binder and apparently for that reason do not separate well in plain water, i. e. water without one or more dispersants added. Whitewater used in wet process machines for making mats, unlike plain water in the gypsum board slurry process, contain various viscosity modifiers, defoaming agents, dispersants and other chemical additives that permit the fibers to disperse as desired.

Therefore, there is a need for a fiber product having a chemical sizing thereon that will permit the fiber to disperse quickly, adequately and uniformly in plant water.

SUMMARY OF THE INVENTION

The present invention includes a staple inorganic fiber having a chemical sizing, having a very high surfactant level on its surface. The fibers resulting are advantageous in any process where it is desired to disperse inorganic fiber in plant water. The invention also includes a size composition for inorganic fibers and a method of making a chopped inorganic fiber product for use in dispersing in plant water in a process for making a fiber reinforced product such as gypsum board. The term "staple" includes fibers of various lengths under a few inches long. The fibers can all be of generally the same length or can be a mixture of lengths. For the present invention, lengths of less than 1.5 inches, such as one-half, one, three-fourths, one-quarter, etc. inch long are preferred. A length of one-half inch is particularly suitable for making gypsum board.

The novel size composition on the glass fiber comprises a plant water, deionized water, or distilled water, a high level of surfactant and preferably a film former polymer like polyvinyl alcohol, and can contain a biocide to retard microbial action. The surfactant is preferably a poly (Oxy-1,2-ethanediyl), alpha(2-(bis(2-Aminoethyl)Methyl-ammonio)Ethyl)-omega-Hydroxy-, N,N'-Di(C14–18 and C 16–18 unsaturated) Acyl Derivs., Me Sulfate (Salts). The sizing composition contains about 0.1–1.2 wt. percent surfactant, preferably about 0.3–0.9 wt. percent and most preferably about 0.6+/−0.1 wt. percent. Other known surfactants compatible with water and known to act similarly to the family of surfactants mentioned just above can be used individually or in combination to replace all or a portion of the family of surfactants described just above.

The film former polymer is preferably present in amounts up to 1.5 wt. percent, preferably about 0.2–0.8 wt. percent and most preferably about 0.5+/−0.1 wt. percent. All weight percentages of the sizing composition are based on the total weight of the sizing including water. When a biocide is used, it is present in effective amounts for this function and that can vary depending on the particular biocide chosen.

The fiber product can be dry or can contain up to about 25 percent moisture. Preferably the fibers are glass fibers chopped in lengths less than 1.5 inches, such as one-half, one, three-fourths, one-quarter, etc. inch long. The fibers can be of any suitable diameter, preferably between 5–23 micron. The fibers have a loss on ignition, due to the chemical sizing on their surfaces, of about 0.08–0.24 percent and preferably about 0.1–0.21 wt. percent and most preferably about 0.13–0.19 percent with a target of about 0.16 wt percent. The surfactant is at least about 30 wt. percent of the LOI and preferably at least 40 wt. percent up to as much as about 60 wt. percent with a film former making up the remainder with the exception of a minor, effective amount of a biocide. The fibers are made according to known processes, but using the inventive size composition to coat the fibers in place of conventional sizing compositions. The invention also includes the method of using the inventive fibers in processes for making fiber reinforced products where the fibers are dispersed in plant water as an early step in the process, such as a process for making gypsum board.

DETAILED DESCRIPTION OF THE INVENTION

Chopped or staple inorganic fiber for use in reinforcements can be made using a number of different processes as is well known. The preferred process for making the preferred embodiment of the present invention which is a chopped sized glass fiber product is a well known process such as shown in U.S. Pat. Nos. 4,692,178, 4,194,896, and 3,869,268, the disclosures of which are incorporated herein by reference. Other processes for making mineral wool, staple glass or ceramic fibers having a chemical sizing on the longitudinal surfaces of the fibers would also be suitable. In the processes for making the preferred embodiments of the invention, which comprise continuously chopped fiber glass strands, glass fibers are pulled from fiberizers in a known way. A water mist is sprayed on the hot fibers to cool the fibers and then the fibers are pulled over a chemical sizing applicator where a chemical sizing, preferably an aqueous chemical sizing, is coated onto the fibers by bringing the fibers into contact with a curved surface having a layer of sizing thereon. The coated fibers are then pulled as a strand, usually along with several other strands of sized glass fibers, into a continuous chopper where the strands are chopped into desired lengths and discharged onto a conveyor, a dryer or into a package.

When it is desired to dry the fibers partially or completely, a vibrating fluid bed dryer like that shown in U.S. Pat. No. 4,840,755, or any suitable dryer, can be used. When it is desired to package the fibers without further drying, the discharged chopped fibers are discharged directly or indirectly into a plastic bag and sealed for shipment.

The fibers are preferably glass fibers and preferably E (electrical) and T (chemical resistant) glass fibers although other types of glass fibers including C, insulation glass, S, and R glass fibers are usable in the present invention. Any desired length is suitable; however, fiber to make gypsum board is preferably one-half inch long fibers. The chopped strands typically contain at least 2000 fibers each, but can contain substantially less and up to 4000 or more fibers. The diameter of the fibers can be any desired diameter within reason and usually the average fiber diameter is between 5 and 23 microns. Most typical products have fiber diameters of 16+/−1 micron or 13+/1 micron, but the fiber diameter is not critical to the invention.

In practice, the sizing of the present invention is applied to the fibers according to one of the processes described above, or the aqueous sizing is sprayed onto the fibers while the fibers are suspended in the air in the known processes of applying binder to staple fibers for making fiber insulation products. The sizing is applied to the fibers in such concentrations to produce a fiber product having a loss on ignition (LOI) due to the chemical sizing in a range of 0.08–0.24 weight percent, based on the dry weight of the fiber product, preferably within a range of 0.11–0.21 wt. percent and most preferably 0.16+/−0.03 wt. percent. The chemically sized fiber can be dried completely, but preferably the sized fiber is packaged wet with a moisture content in the range of about 5–25 wt. percent, preferably in the range of about 10–20 wt. percent and most preferably in the range of 15+/−2 wt. percent.

The sizing composition of the present invention contains plant, deionized or distilled water, preferably plant water, a very level of surfactant, compared to conventional sizings for fibers, in an amount of about 0.1 to about 1.2 wt. percent, preferably about 0.3–0.9 wt percent, and most preferably about 0.5–0.7 wt. percent, based on the weight of a sizing batch. The surfactant is preferably a poly (Oxy-1,2-ethanediyl), alpha(2-(bis(2-Aminoethyl)Methyl-ammonio) Ethyl)-omega-Hydroxy-, N,N'-Di(C 14–18 and C 16–18 unsaturated) Acyl Derivs., Me Sulfate (Salts) and most preferably is Varisoft™ 222LT available from the Witco Corporation of Dublin, Ohio. Verisoft™ SDC, available from the same company, is also suitable. The Varisoft™ 222 LT contains 80–95 percent of Methyl bis(Alkylamidoethyl) 2-Hydroxyethyl Ammonium Methyl Sulfate, Ethoxylated surfactant and 5–15 percent isoproponol, has an approximate specific gravity of 0.98 at 73 degrees F., a vapor pressure of 33 mm/Hg at 68 degrees F. and an NIT boiling point of 180 degrees F. at 760 mm Hg. Other known surfactants can be used, alone or in combination, to replace all or part of the specific surfactants described above. Such surfactants include glycols, fatty acid tallow amines like CAT-X™, Aromoxrm DM-16 and DMHT and others, but the surfactant Varisoft™ 222 LT disperses optimally.

The sizing composition of the present invention can also contain a polymer film former, preferably a polymer film former like polyvinyl alcohol, a hydroxyethyl cellulose, a polyacrylamide or other known film former for fiber sizing in an amount in the range of 0 to about 1.5 wt. percent, preferably in the range of about 0.25–about 0.75 wt percent and most preferably about 0.4–0.06 wt. percent. The primary purpose of the film former is to protect the surface of the fiber, if necessary. Also, if the surfactant is used in a concentration near the high side of the acceptable range, a film former might not be needed in the sizing. However, due to the higher cost of the surfactant, and higher fiber processing cost at the higher levels, it is preferred to use a film former in the sizing composition in the above amounts.

A vinyl polymer film former such as for example polyvinyl alcohol is preferred and one preferred polyvinyl alcohol film former is available from Air Products and Chemicals, Inc. of Allentown, Penn. under the tradenames of Vinol™ or AIRVOL™ and most preferably is AIRVOL™ 205. Other known polyvinyl alcohol film formers for fiber sizing compositions may also be suitable.

When it is desired to protect the sizing in storage or on the fiber from bacterial or microbial activity, a biocide is included in the sizing in an effective amount for this function and the amount will vary depending on the particular biocide chosen. Preferably a biocide such as for example Chemtreat™ CL 206 or CL 2150 is used, preferably in an amount of about 0.084 wt. percent, but other known biocides may also be used in effective amounts. Biocide may not be necessary if the sized fiber is dried or if the wet fiber is used within a short period of time or if an unpleasant aroma is not deemed a problem. If excessive bacterial action is allowed, the sizing may not perform satisfactorily. Preferably, a biocide is included to prevent bacterial action.

The amount of sizing on a fiber is determined by subjecting the fiber to the well known loss on ignition test, or "LOI" test. To accomplish an LOI test, a sample of sized fiber is weighed carefully and thoroughly dried and weighed again to determine the moisture content of the fiber, based on the dry weight of the fiber. The fiber is put into a furnace at a temperature exceeding 1000 degrees F. and having an air atmosphere to drive off all volatiles from the sizing and to bum off all organic materials in the sizing. Thereafter, the fibers are weighed again to determine the weight of the bare fibers. The difference between the dry weight and the bare fiber weight is then used to calculate the amount of dry sizing on the fibers, based on the weight of the bare fibers. Based on LOI, the resulting fiber product of the present invention has from about 0.08 to about 0.24 weight percent of dry sizing on the fiber, preferably about 0.12 to about 0.2 weight percent and most preferably about 0.16+/−0.03 wt. percent. Of the dry sizing on the dry fiber, the cationic surfactant ingredient will preferably constitute at least about 30 wt. percent, preferably at least 40 or 45 wt. percent, up to about 60 wt. percent, and most preferably about 42–48 wt. percent. A film former will preferably be present and constitute at least about 20 wt. percent of the LOI, preferably about 35–50 wt. percent or more, and most preferably about 39–46 wt. percent. The fiber product of the present invention can be dry, but preferably is wet having a moisture content of about 5 to about 25 weight percent, preferably about 15+/−2 wt. percent.

When the fiber product of the present invention is added, such as by dumping or feeding slowly, to plain plant water, containing no dispersants, the fiber quickly disperses thoroughly and uniformly as desired and in a substantially different and superior degree compared with previous staple glass fiber products. This is very useful in any process where it is desirable to disperse fiber in plant water. The present fiber product is particularly useful in the process of making gypsum board in a processes like that disclosed in U.S. Pat. No. 4,241,136, the disclosure of which is incorporated herein by reference, and other similar processes of making gypsum board where early in the process the fiber is added to plant water.

EXAMPLE

An aqueous sizing batch was made, containing plant water, in this case city water, 0.6 wt. percent of Varisof™ 222 LT surfactant, 0.5 wt. percent AIRVOL™ 205 and 0.084 wt. percent Chemtreat™ CL 206. All percentages are based on the weight of the finished aqueous sizing composition. This sizing was applied to water wet E glass fibers continuously in a known manner and the fiber was chopped continuously into one-half inch lengths. The fiber making process was controlled in a known manner to produce a sized fiber product having a moisture content in the range of 13–17 wt. percent with an average of about 15 wt. percent and an LOI in the range of 0.13–0.19 wt. percent and an average LOI of about 0.16 wt. percent on the basis of dry fiber weight. The fiber product was packaged in sealed plastic bags and shipped to a gypsum board manufacturer. When this fiber product was added to plain plant water, the fiber dispersed quickly and uniformly and substantially better than the fiber product being used in production, and produced a gypsum board having a superior uniformity of fiber content throughout the board product.

When the word "about" is used herein it is meant that the amount or condition it modifies may vary so long as the advantages of the invention are realized. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

Having disclosed the preferred embodiments of the invention and its uses in detail above, other modifications and uses will be apparent to the skilled artisan which modifications and uses are encompassed in the following claims.

What is claimed is:

1. A staple fiber product that disperses quickly and uniformly in water comprising fibers having a chemical sizing on the fiber surfaces in an amount to produce a loss-on-ignition (LOI) of the fiber in the range of about 0.08 to about 0.24 weight percent, on a dry fiber basis, said sizing containing one or more surfactants in an amount such that the surfactant content is responsible for about 30 weight percent to about 60 weight percent of the LOI.

2. The fiber product of claim 1 wherein said fibers are glass fibers.

3. The fiber product of claim 2 wherein said sizing further comprises a film forming polymer in an amount of up to 50 wt. percent of the LOI.

4. The fiber product of claim 3 wherein said sizing is present on said fibers in an amount in the range of about 0.13–0.19 wt. percent.

5. The fiber product of claim 4 wherein the fiber is wet and has a moisture content in the range of about 5–25 wt. percent, based on the dry fiber weight.

6. The fiber product of claim 5 wherein a biocide is present in an effective amount to prevent bacterial or microbial action in the sizing on the fiber.

7. The fiber product of claim 2 wherein the surfactant is a cationic surfactant.

8. The fiber product of claim 7 wherein the film former is polyvinyl alcohol and the glass is E glass.

9. The fiber product of claim 7 wherein the cationic surfactant is a poly (Oxy-1,2-ethanediyl), alpha(2-(bis(2-Aminoethyl) Methyl-ammonio) Ethyl)-omega-Hydroxy-, N,N'-Di(C 14–18 and C 16–18 unsaturated) Acyl Derivs., Me Sulfate (Salts) and is responsible for about 40–50 percent of the LOI, the film former is polyvinyl alcohol and is responsible for about 39–46 percent of the LOI, the glass is E glass and the moisture content of the glass fiber product is between about 5–25 wt. percent.

10. The fiber product of claim 7 wherein the amount of sizing on the fiber is in the range of about 0.13–0.19 wt. percent, the cationic surfactant is a poly (Oxy-1,2-ethanediyl), alpha(2-(bis(2-Aminoethyl)Methyl-ammonio) Ethyl)-omega-Hydroxy-, N,N'-Di(C 14–18 and C 16–18 unsaturated) Acyl Derivs., Me Sulfate (Salts) and is responsible for about 40–50 percent of the LOI, the film former is polyvinyl alcohol and is responsible for about 30–46 percent of the LOI, the glass is E glass and the moisture content of the glass fiber product is in the range of about 15+/−5 wt. percent.

11. A staple fiber product that disperses quickly and uniformly in water comprising fibers having a chemical sizing on the surfaces of the fibers in an amount to produce a loss-on-ignition (LOI) of the fiber in the range of about 0.12 to about 0.2 weight percent on a dry fiber basis, said sizing containing a film forming polymer in an amount of up to about 50 weight percent of the LOI and one or more surfactants in an amount such that the surfactant content is responsible for about 30 weight percent to about 60 weight percent of the LOI.

12. A staple fiber product that disperses quickly and uniformly in water comprising E glass fibers having a chemical sizing on the surfaces of the fibers in an amount to produce a loss-on-ignition (LOI) of the fiber in the range of about 0.12 to about 0.2 weight percent on a dry fiber basis, said sizing containing polyvinyl alcohol in an amount of up to about 50 weight percent of the LOI and one or more cationic surfactants for about 30 weight percent to about 60 weight percent of the LOI.

* * * * *